US006258199B1

(12) United States Patent
Lingamfelter et al.

(10) Patent No.: US 6,258,199 B1
(45) Date of Patent: Jul. 10, 2001

(54) METHOD FOR TRANSFERRING VINYL DESIGNS FROM BACKING PAPER TO A SUBSTRATE

(76) Inventors: Peter Shaw Lingamfelter, deceased, late of New Braunfels, TX (US); C. Brown Lingamfelter, legal representative, 60 State St., Boston, MA (US) 02109

( * ) Notice: Subject to any disclaimer, the term of this patent is extended or adjusted under 35 U.S.C. 154(b) by 0 days.

(21) Appl. No.: 08/946,725

(22) Filed: Oct. 8, 1997

Related U.S. Application Data

(63) Continuation of application No. 08/586,229, filed on Jan. 16, 1996, now abandoned.

(51) Int. Cl.[7] .......................... B44C 1/165; B32B 31/18; B32B 31/20; B32B 7/12

(52) U.S. Cl. .......................... 156/235; 156/230; 156/240; 156/247; 156/248; 156/289; 427/146; 427/147; 428/40.1; 428/41.8; 428/42.1; 428/914

(58) Field of Search .................................... 156/247, 248, 156/249, 268, 230, 240, 289, 277, 235, 265; 427/146, 147; 428/40.1, 41.7, 41.8, 42.3, 964, 42.1

(56) References Cited

U.S. PATENT DOCUMENTS

| | | | | |
|---|---|---|---|---|
| Re. 32,249 | | 9/1986 | Esmay | 428/40 |
| 4,339,886 | * | 7/1982 | Griffiths et al. | 40/495 |
| 4,545,185 | * | 10/1985 | Chikatani | 52/583 |
| 4,604,153 | * | 8/1986 | Melbye | 156/235 |
| 4,693,935 | | 9/1987 | Mazurek | 428/352 |
| 4,737,577 | | 4/1988 | Brown | 528/501 |
| 4,909,884 | | 3/1990 | Wormser | 156/248 |
| 4,919,741 | | 4/1990 | Chirhart et al. | 156/223 |
| 4,985,488 | | 1/1991 | Landin | 524/555 |
| 5,028,484 | | 7/1991 | Martin et al. | 428/352 |
| 5,030,491 | | 7/1991 | Shoesmith | 428/41 |
| 5,049,085 | | 9/1991 | Reylek et al. | 439/91 |
| 5,049,434 | | 9/1991 | Wasulko | 428/202 |
| 5,053,452 | | 10/1991 | Spada et al. | 524/707 |

OTHER PUBLICATIONS

Mitchell, Larry S., "Vinyl Graphics", Signs of the Times, v.217.n.1., pp. 72B, Jan. 1995.*

* cited by examiner

*Primary Examiner*—Richard Crispino
*Assistant Examiner*—J. A. Lorengo
(74) *Attorney, Agent, or Firm*—Jackson Walker LLP

(57) ABSTRACT

Applicant's unique method provides for the use of a single piece of transfer tape for multiple transfers, with the transfer tape being forgiving, clear, having a high shelf life, and being non-self destructive. Such a method has been heretofore unavailable.

4 Claims, 5 Drawing Sheets

METHOD FOR TRANSFERRING VINYL DESIGNS FROM BACKING PAPER TO A SUBSTRATE

This is a continuation of applicaton Ser. No. 08/586,229 filed on Jan. 16, 1996 now abandoned.

Sign making, more specifically, utilizing a unique method of transferring vinyl sign designs from backing paper to a substrate.

BACKGROUND OF THE INVENTION

In the last 15 years or so, the use of vinyl for sign making, especially for designating letters or numbers, has become common. Sheets of vinyl, which are adhered to a protective (typically paper) backing host utilizing an adhesive, are cut into the desired shape and then transferred from their protective backing to a suitable substrate. These vinyl letters and/or numbers or other designs are frequently used on automobiles, planes, billboards, windows, sign and the like. The letters and/or numbers and/or designs come in various sizes and colors.

Sign makers transfer the vinyl letters from the paper backing to the substrate through the use of transfer tape. Several companies that provide distribute tape are: Spartan International, Inc., 1845 Cedar Holt, Mich. 48842; R Tape Corp., #6 Ingersol Road, South Plainfield, N.J. 07080; and Vector TM Graphics, 925 Sawmill River Road, Yonkers, N.Y. 10710. The transfer tape comes in a roll and is usually opaque, sometimes non-opaque. The transfer tape is sticky on one side and is flexible. The sign maker removes the transfer tape from its roll and cuts it to a size sufficient to transfer the vinyl letters from their backing to the substrate. The transfer tape is pressed against the precut vinyl design and the pressure-sensitive adhesive picks up the vinyl off its backing. The vinyl designs are then ready to place against the substrate. Pressure against the transfer paper and vinyl applied evenly helps ensure good adhesion of the design to the substrate. Following the transfer, the transfer tape is pulled off the designs and then discarded.

Heretofore, the transfer tape has not been capable of multiple transfers in duplicating the process of transferring the designs from the backing to the substrate. That is, heretofore, transfer tape has been "single use". Moreover, transfer tape has, heretofore, been self destructive. By self destructive it is meant that, if one portion of the adhesion side of the transfer tape is to touch another portion of the same side of the transfer tape, subsequent separation typically removes the adhesive layer from one of the two touching portions or destroys its adhesive ability.

Clearly, utility lies in the discovery of a medium to use in place of the heretofore available transfer tape which will allow multiple uses of the same piece of transfer tape for a multiplicity of transfers. Moreover, it is clear that utility will lie in the use of a transfer tape that is non-self destructive—meaning that, if one adhesive portion of the transfer tape touches another, subsequent separation will not destroy the tackiness and ability of the tape to subsequently transfer vinyl from a protective host backing to a substrate. Utility also lies in the utilization of a clear transfer tape so as to allow better positioning of the design to the substrate, especially where registration marks or the like are applied to the substrate to assist in positioning. Last, utility lies in the use of a transfer tape that, between transfers, can be placed sticky side down onto a temporary backing medium to protect its adhesive side when not in use, but which may be released and reused for transfers without destroying its tackiness.

Thus, utility is provided in transfer tape that provides sufficient tack (adhesive) capabilities (including tack retention) such that it can be used repeatedly to transfer vinyl letters from a paper backing to a substrate. Further utility lies in a transfer tape sufficiently clear to allow proper positioning of the vinyl letter material to the substrate. Further utility lies in the use of a transfer tape that can be placed against foreign surfaces but which will release and allow re-adhesion to vinyl sign material capable to lift such material off its backing. Further utility lies in the use of a transfer tape that has a high shelf life, specifically one which, after one or more uses, may be set aside for a period of approximately 30 days and then reused to transfer vinyl sign material from a paper backing to a substrate.

SUMMARY OF THE INVENTION

In summary, applicant's unique method provides for the use of a single piece of transfer tape for multiple transfers, with the transfer tape being forgiving, clear, having a high shelf life, and being non-self destructive. Such a method has been heretofore unavailable.

DETAILED DESCRIPTION OF THE PREFERRED EMBODIMENT

FIGS. 1–5 illustrate a typical transfer operation whose objective is to transfer vinyl designs (such as letters) from an adhesive backing to a substrate.

Figure 1:
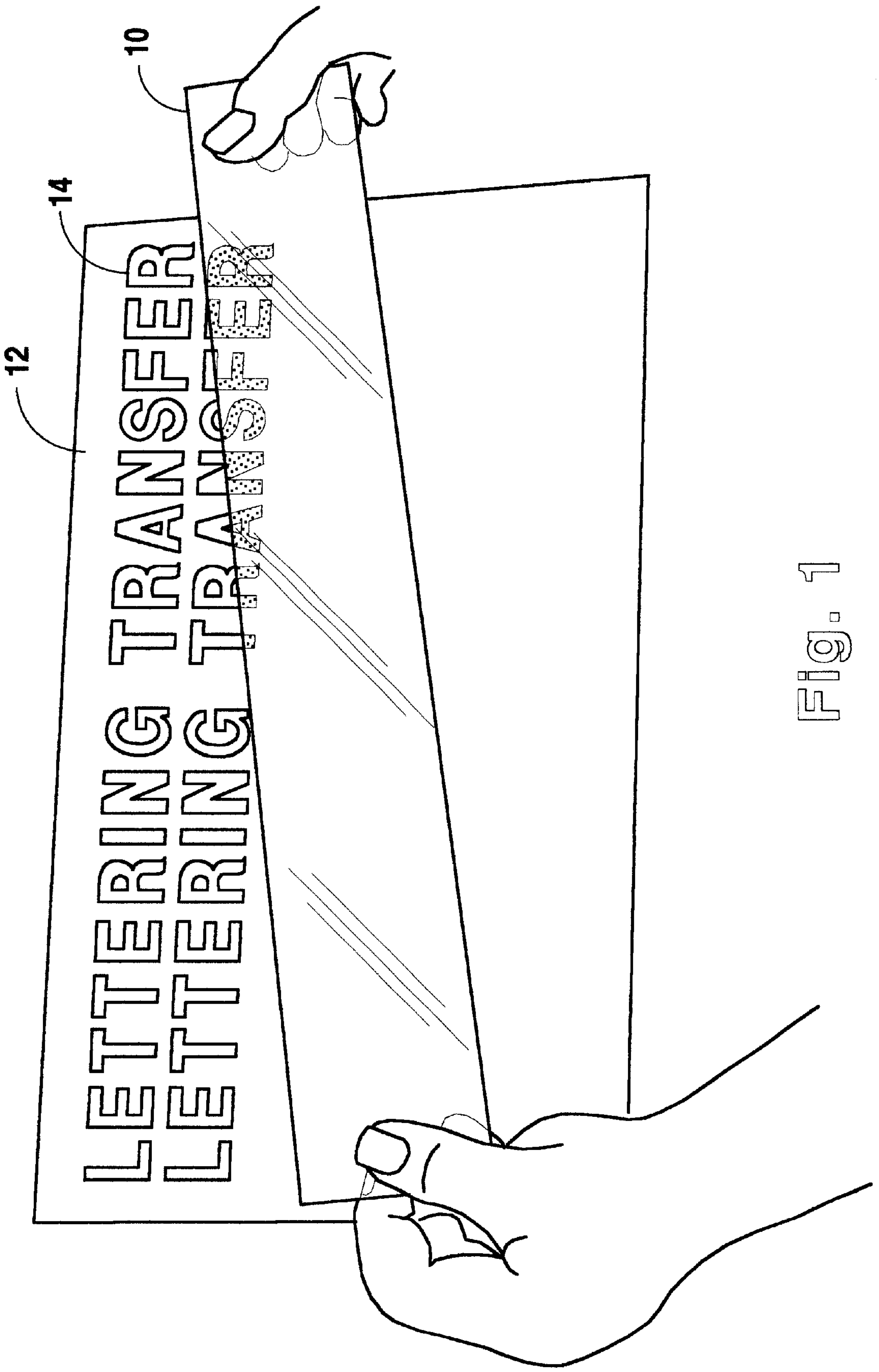
FIGS. 1–5 illustrate, in perspective views, the steps, set forth sequentially, of applicant's method.

Here, in FIG. 1, the user is illustrated holding a piece of appropriately sized transfer tape (10) stretched between his hands and poised to place it, adhesive side down, to vinyl sign material (12) with letters (14) cut out.

Figure 2:
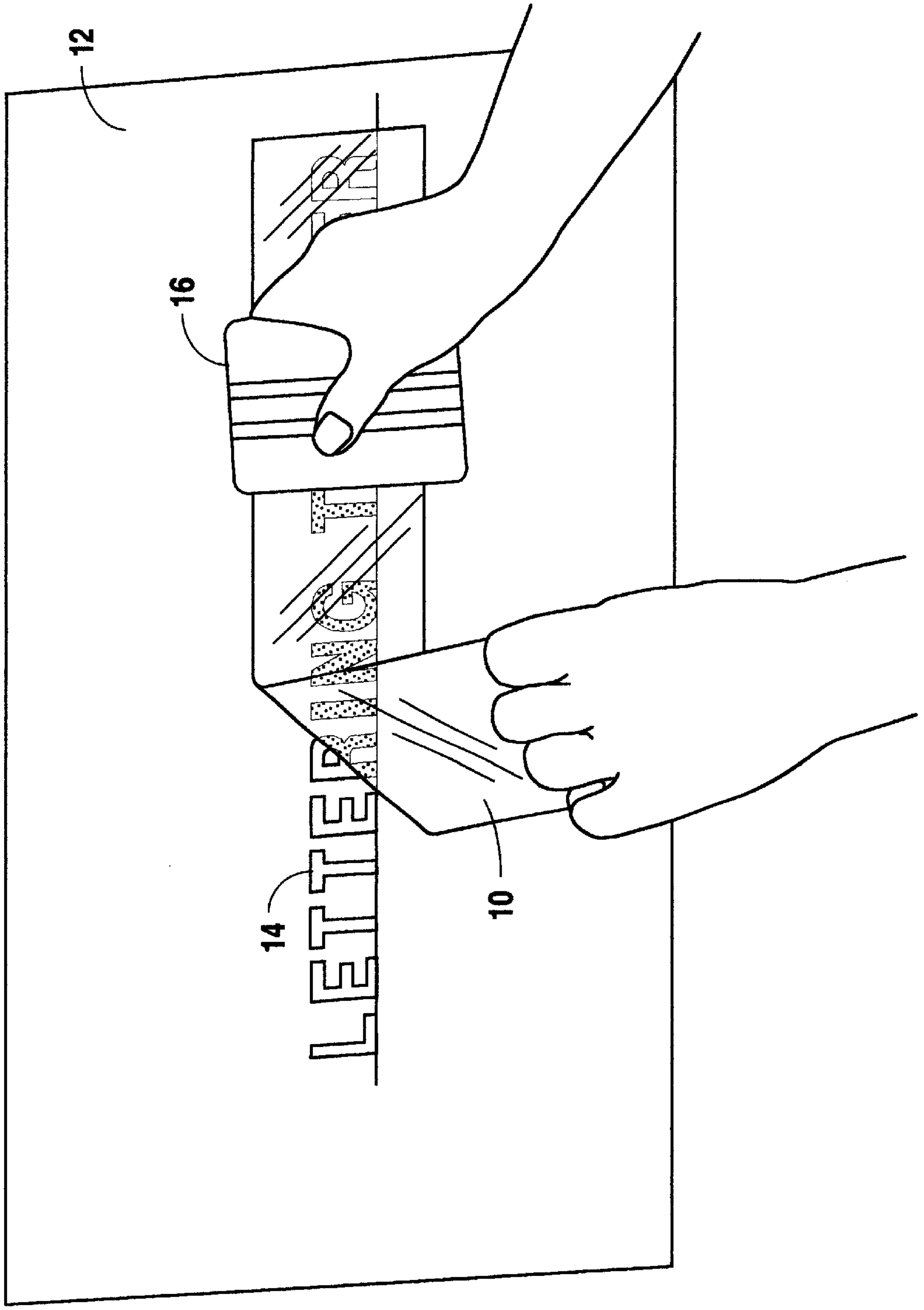

FIG. 2 illustrates the application of transfer tape (10) to letters (14) by applying pressure, as through a squeegee (16).

Figure 3:
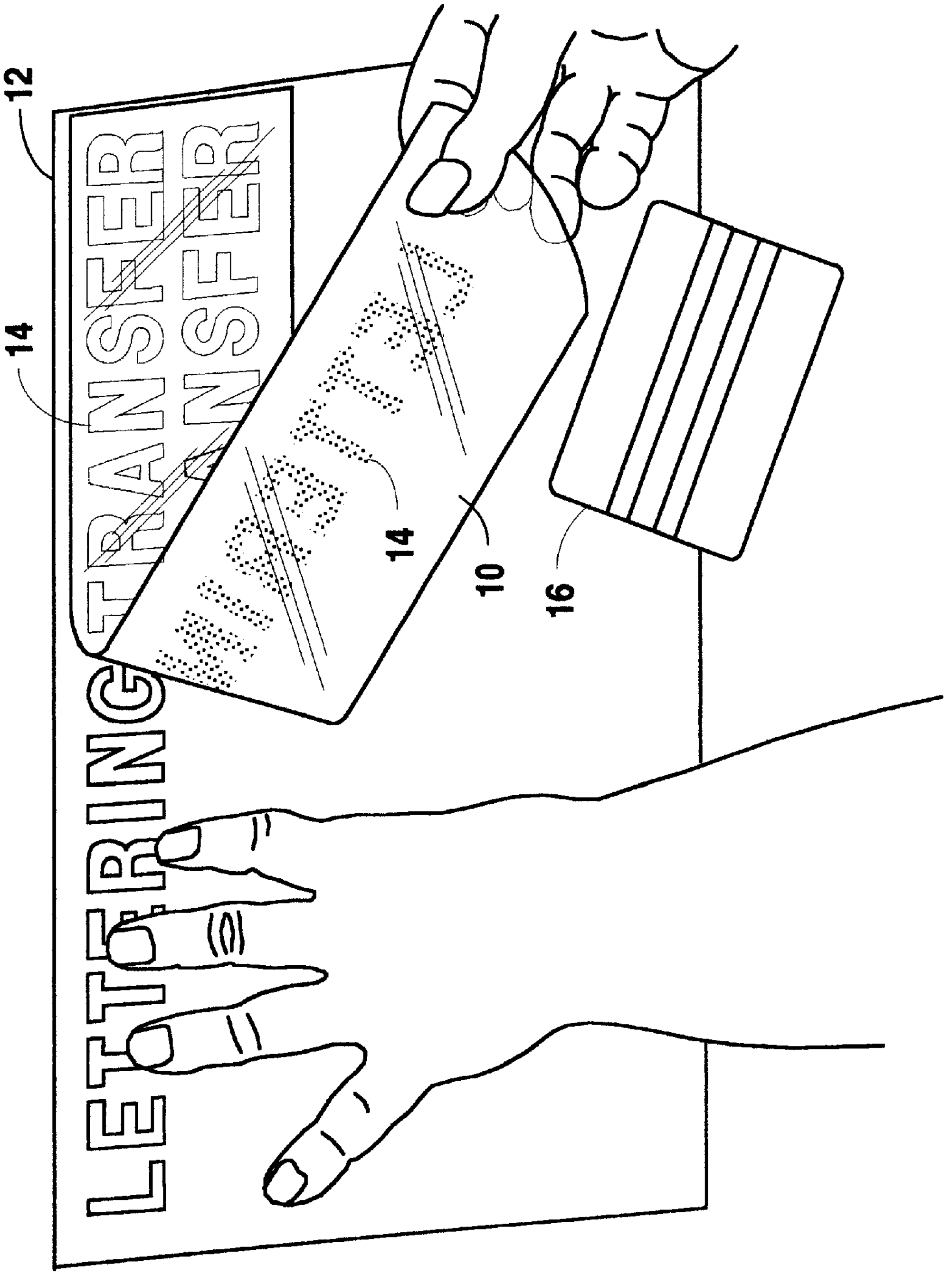

FIG. 3 illustrates the user holding vinyl sign material (12) down as transfer tape (10) is lifted off, the lift off releasing letters (14) from the paper backing of vinyl sign material (12) and onto the adhesive side of transfer tape (10).

Figure 4:
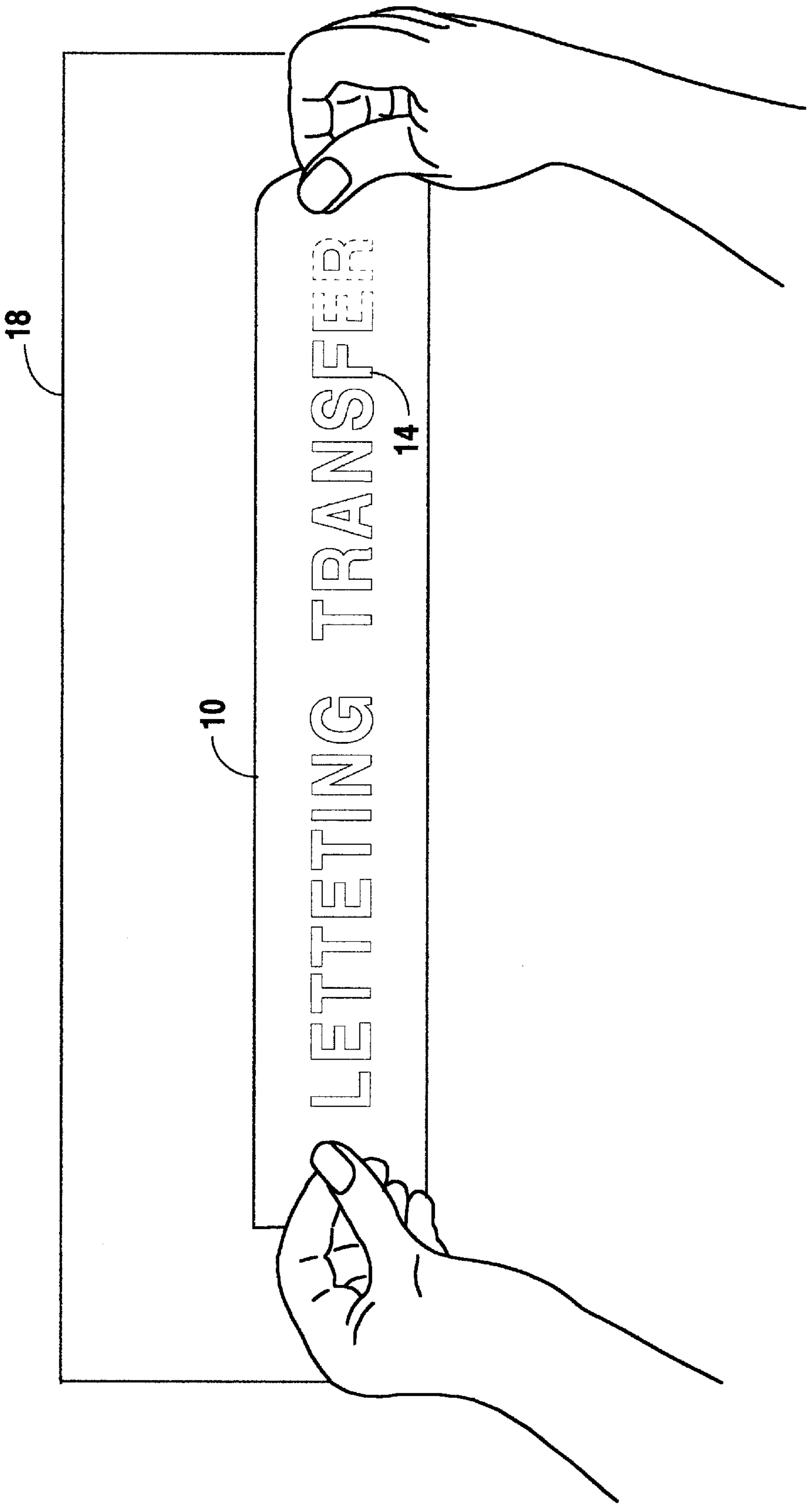

FIG. 4 illustrates transfer tape (10) with all of vinyl letters (14) attached to the adhesive side thereof, having been lifted off from their paper backing, with the user poised to place the letters on substrate (18) in their preferred location.

Figure 5:
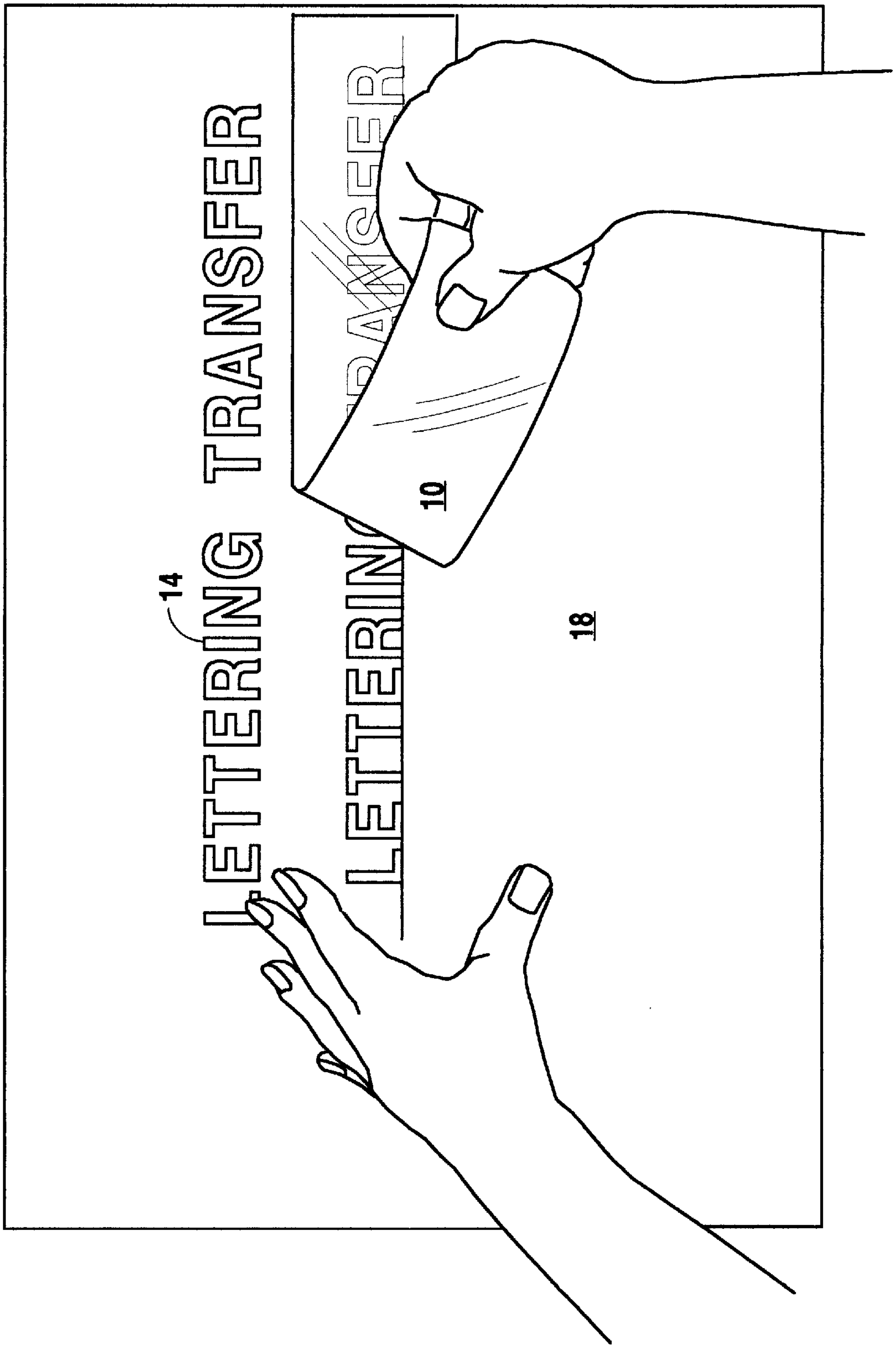

FIG. 5 illustrates the removal of transfer tape (10) from letters (14), letters (14) having been adhered to by the application of pressure, as through a squeegee (16) (see FIG. 2), being rubbed across the non-adhesive side of transfer tape (10) to force the letters (14) onto substrate (18). The removal of the transfer tape leaves letters (14) on the substrate (18). The removal is effected by a slow uniform pull of one end of the transfer tape (10) across the substrate, generally along the longitudinal axis of the transfer tape.

Applicant's method then, if for the repetition of the above steps using the same piece of transfer tape for transferring vinyl signage designs which have an adhesive and non-adhesive side, the adhesive side adhering to a protective backing or host paper to a substrate, typically glass, metal, fiberglass, wood, stiff plastic, styrene, or the like, using a transfer member, the transfer member having an adhesive side and a non-adhesive side. One transfer member sufficient to practice applicant's method is presently being sold under the trademark MAGIC COVER®, the registered trademark of Kittrich Corporation, MAGIC COVER® Division, 4500

District Boulevard, Los Angeles, Calif. 90058. Vinyl signage members are supplied to the sign industry by such companies as Spartan International, Inc., 1845 Cedar Holt, Mich. 48842; Vector TM Graphics, 925 Sawmill River Road, Yonkers, N.Y. 10710; and Universal Products, Inc., 521 Industrial 57, Goddard, Kans. 67052. Typically the vinyl signage material is on a backing paper that comes in rolls about 15 inches wide in a variety of color and thicknesses, typically between 2 ml and 4 ml thick.

Applicant's preferred transfer member is the MAGIC COVER® self-adhesive, vinyl, decorative coverings from Kittrich that is available in clear. Heretofore, the Kittrich product has been provided to consumers to affix to the surface of shelves, notebooks, pages, diplomas, posters, cards, books and manuals, newspapers clippings, and the like in order to provide protection and durability to the substrate while allowing viewing of the covered and protected document, shelf or sheet. The nature of the self-adhesive vinyl MAGIC COVER® member has been found to provide the surprising and beneficial advantages heretofore unrealized in existing transfer tape—namely, reusability, allowing repeated transfers utilizing the same transfer member. Heretofore, available transfer tape has been used for a single transfer (or, at most, two) of a design from its host paper backing to the substrate and then thrown away. Additional designs or transfers are done with additional sheets of transfer tape. Applicant has discovered a unique usage of the MAGIC COVER® material heretofore unused in the signage industry by applying its highly desirable adhesive characteristics to a unique method of repeatedly reusing the same transfer member for removing vinyl signage designs from protective host paper to a substrate.

Thus, applicant's method begins with the following materials: a properly sized transfer member, such as the MAGIC COVER®; and a sheet of vinyl signage material with the letters, numbers, or other pleasing designs cut out from the roll, typically by use of computers through devices and methods known in the trade.

Working in a clean, flat, well-lit area, the worker first applies the adhesive side of the transfer member, after having removed the backing paper (if it comes with backing paper) from the transfer member and laying the backing paper aside for storing the transfer member when not in use or other suitable clean storage surface. Applying the adhesive side of the transfer member to a first vinyl signage design is done with sufficient pressure against the back (non-adhesive) side of the transfer member to adhere the adhesive side of the transfer member to the non-adhesive side of the vinyl signage design. When this is completed, the transfer member is lifted to remove from the paper host material the vinyl signage design. Application of the vinyl signage design to the substrate is the next step. This is done by applying the vinyl signage design in the appropriate location on the substrate and then applying smooth and uniform pressure across the transfer member, urging the adhesive side of the vinyl signage design against the surface of the substrate sufficiently to assure complete and uniform adhesion of the vinyl signage material to the substrate in its proper location. This concluded, removal of the transfer member from the non-adhesive side of the first vinyl side material is proper.

Applicant has discovered a novel method utilizing the heretofore undiscovered (for transfer purposes) material, MAGIC COVER® from Kittrich Corporation, which has the unique ability to retain sufficient adhesion and tackiness to be reused under normal working conditions, typically up to at least 6 times. Applicant has used a single piece 56 times, and it still had sufficient tackiness. Moreover, applicant provides the unique step of allowing the placement of the adhesive side of the transfer member to its original backing papers or other materials, such as vinyl signage design material, while still being capable of being released and reused for transfer purposes. Applicant's method allows the transfer tape to stick to itself when folded onto itself, and to retain its usefulness when pulled apart for reuse.

Applicant has performed the following tests, all utilizing the MAGIC COVER® material:

Test 1

Utilizing 3 ml Vector vinyl sign material provided by Vector Graphics, Inc. of Yonkers, N.Y. 10710, letters were cut into 4" height for transfer from the host paper backing material to a coroplast, a corrugated plastic sheet approximately ¼" thick, in a clean, dry state. Applicant measured and cut a piece of MAGIC COVER® 6" high and 18" in length. The paper backing was removed and transfer, according to the steps set forth above, was repeated. The vinyl is precut and the undesired vinyl is removed. A series of 15 words containing 6 letters prespaced on the vinyl backing material was transferred and accurately positioned, one set below the other, on the substrate in approximately 8 minutes. It was observed during this test that, throughout the 15 transfers, there was no discernable loss in the ability of the transfer paper to pick up additional signage material (vinyl or any other like adhesive sign material) after the first signage material was transferred.

Test 2

The same steps of Test 1 were repeated except that, between each transfer, the transfer member was firmly placed, adhesive side down, on the protective backing paper that the vinyl signage material was removed from. Between each step, the transfer member had to be removed from the backing material; and no discernable curling of the transfer material or loss of tackiness or ability to effect proper adhesion to the vinyl signage material was noticed.

Test 3

The same steps of Test 1 were repeated except that, prior to the application of the vinyl signage material to the substrate, the substrate material surface to receive the vinyl is sprayed with a mist coating of water, the vinyl letters are applied and squeegeed with sufficient pressure.

Applicant notes that, compared to presently existing transfer tape (which loses its adhesion when it touches the water on the substrate), applicant's unique step allows for repeated use of the same transfer member, even when it has been dampened with water picked up from the substrate.

Comparison Tests

Applicant's comparison test method consists of the following steps:

A) cutting vinyl letters, all the same size (4" high and 18" long) from the same roll of vinyl;

B) preparing the substrate (in this case, clean styrene) onto which letters are to be transferred by wiping with a clean, wet rag and allowing to dry;

C) placing transfer tape (6"×18") over letters;

D) applying constant pressure to transfer tape through the application of 12 lbs. of weight on a 40 square inch patch to pick up the letters;

E) making 8 passes of the weight at a constant speed over the transfer tape (a pass is the weight going over the tape one time, one way);

F) lifting the transfer tape slowly, with uniform pressure, with letters on tape;

G) placing transfer tape, with letters, onto styrene (no additional pressure applied);

H) using same weight and patch (as in D above) to apply pressure;

I) making 8 passes of the weight at a constant speed over the transfer tape (a pass is the weight going over the tape one time, one way); and J) pulling transfer tape up.

Results

1. The above process (A–J) was repeated using one 6"×18" piece of MAGIC COVER® a total of 15 times with 100% effectiveness each time.

2. The piece of MAGIC COVER® used in "1" was then folded together (in half), opened and used in the same process (A–J above 1 time) with 100% effectiveness.

3. The above process (A–J) was done using one 6"×18" piece of Vector™ System 3 Premium Application Tape 3 times: the first time with 100% effectiveness, the second time with 70% effectiveness, and the third and subsequent attempts yielding 0% effectiveness. The Vector™ System 3 Premium Application Tape was useless as a transfer tape after the second use. Vector™ System 3 Premium Application Tape is a transfer tape with the same weight, color, and adhesiveness (and other properties) as many other transfer tapes used in the sign industry. There are many brand names of transfer tape with their product interchangeable with other companies' transfer tapes.

4. The tests were all done under the same conditions and variables and by the same individual.

5. The word "effectiveness" as used above means applying transfer tape, lifting letters, and reapplying transfer tape with letters on it to the substrate, then lifting the transfer tape off of the letters and leaving 0–100% of the letters on the designated substrate (100% being all the letters, 50% being half the letters, etc.), as desired, without letters sticking to the transfer tape or not releasing from the transfer tape when appropriate.

6. The "letters" in the above process could be any shape, design, numbers, or the like. The purpose was to use identical shapes and sizes in all testing under the same conditions. The term vinyl signage designs is used to denote numbers, letters, or any vinyl designs.

7. A second decorative covering that has been found to be effective as a transfer tape according to applicant's novel method is sold under the registered trademark TYE-TAC®. TYE-TAC® is the registered trademark of Tye-Sil Corporation Ltd. of 5505 Des Grandes Prairies Boulevard, Montreal, Quebec Canada H1R 1B3 (a Canadian corporation).

What is claimed is:

1. A method of making a multiplicity of signs from the multiplicity of precut, weeded vinyl designs, the method comprising the steps of:

providing a single transfer sheet having an adhesive and nonadhesive side:

providing a first precut vinyl design on a first host backing;

applying the adhesive side of the transfer sheet to the first precut vinyl design;

lifting the first precut vinyl design from the first host backing and applying the first vinyl design to a sign substrate;

removing the transfer sheet from the first present vinyl design leaving the first precut vinyl design on the sign substrate;

providing a second vinyl design on a second host backing;

applying the adhesive side of the transfer sheet to the second precut vinyl design;

lifting the second precut vinyl design from the second host backing and applying the second vinyl design to the sign substrate;

removing the transfer sheet from the second precut vinyl design, leaving the second precut vinyl design on the sign substrate.

2. The method as set forth in claim 1 further including the step of misting the surface of the sign substrate with water prior to the application of the precut vinyl designs.

3. The method as set forth in claim 1 further including the step of placing the adhesive side of the single transfer sheet to a foreign holding surface.

4. The method of claim 1 further including the step of folding one portion of the single transfer sheet to a second portion of the single transfer sheet by folding the single transfer sheet together, the folding step including the step of unfolding the single piece of transfer sheet.

* * * * *